United States Patent [19]

Tanaka et al.

[11] Patent Number: 5,347,307
[45] Date of Patent: Sep. 13, 1994

[54] PORTABLE CAMERA HAVING A BATTERY COMPARTMENT BELOW THE LENS OPTICAL AXIS

[75] Inventors: Chifuyu Tanaka, Tokyo; Koji Takahashi, Yokohama, both of Japan

[73] Assignee: Canon Kabushiki Kaisha, Tokyo, Japan

[21] Appl. No.: 53,313

[22] Filed: Apr. 27, 1993

Related U.S. Application Data

[63] Continuation of Ser. No. 726,282, Jul. 5, 1991, abandoned.

[30] Foreign Application Priority Data

Jul. 6, 1990 [JP] Japan ................. 2-072064

[51] Int. Cl.⁵ ............................................ H04N 5/225
[52] U.S. Cl. ................................... 348/372; 348/374
[58] Field of Search ............. 358/909, 906, 229, 209, 358/222; H04N 5/225, 5/30, 5/232

[56] References Cited

U.S. PATENT DOCUMENTS

| | | | |
|---|---|---|---|
| 4,651,233 | 3/1987 | Morisawa et al. | 358/906 |
| 4,757,388 | 7/1988 | Someya et al. | 358/909 |
| 4,772,902 | 9/1988 | Inoue et al. | 358/229 |
| 4,819,101 | 4/1989 | Lemelson | 358/906 |
| 4,837,628 | 6/1989 | Sasaki | 358/909 |
| 4,984,090 | 1/1991 | Sasaki et al. | 358/229 |
| 5,038,213 | 8/1991 | Yoda | 358/909 |
| 5,038,213 | 8/1991 | Yoda | 358/909 |
| 5,055,863 | 10/1991 | Lindenfelser et al. | 358/909 |
| 5,081,478 | 1/1992 | Hayashida et al. | 358/229 |
| 5,130,813 | 7/1992 | Oie et al. | 358/906 |
| 5,150,215 | 9/1992 | Shi | 358/900 |

FOREIGN PATENT DOCUMENTS

| | | | |
|---|---|---|---|
| 59-000277 | 1/1984 | Japan | 358/229 |
| 62-038674 | 2/1987 | Japan | H04N 5/232 |
| 1099379 | 4/1989 | Japan | H04N 5/225 |

*Primary Examiner*—Joseph Mancuso
*Assistant Examiner*—Wendy R. Greening
*Attorney, Agent, or Firm*—Fitzpatrick, Cella, Harper & Scinto

[57] ABSTRACT

A camcorder having a battery compartment below the lens optical axis includes optical lenses for receiving light from an object. A housing is provided for housing the optical lenses. A battery load section capable of mounting a battery for supplying power to the housing is disposed at a bottom of the housing. The battery load section is capable of supporting different kinds of batteries of different sizes.

25 Claims, 9 Drawing Sheets

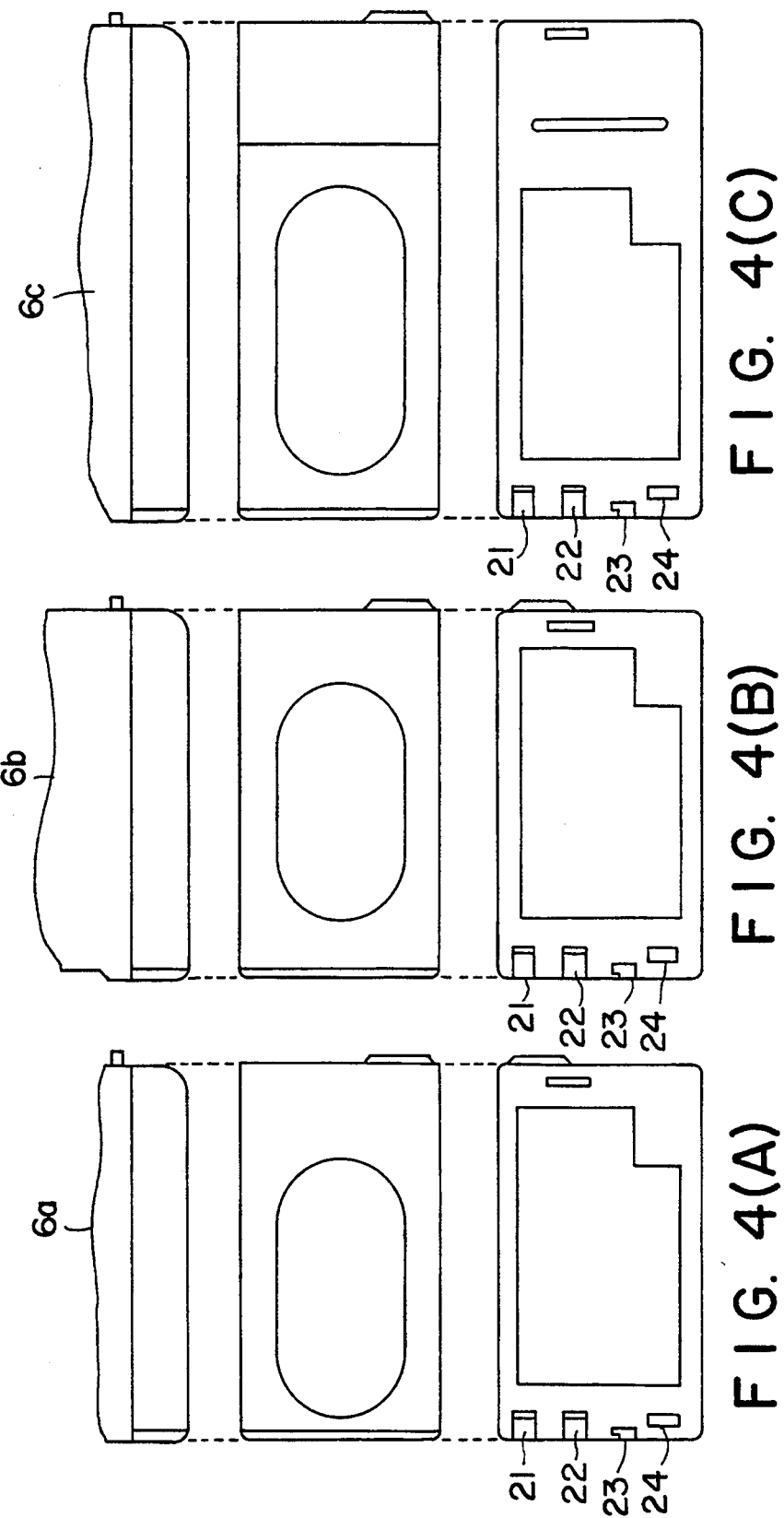

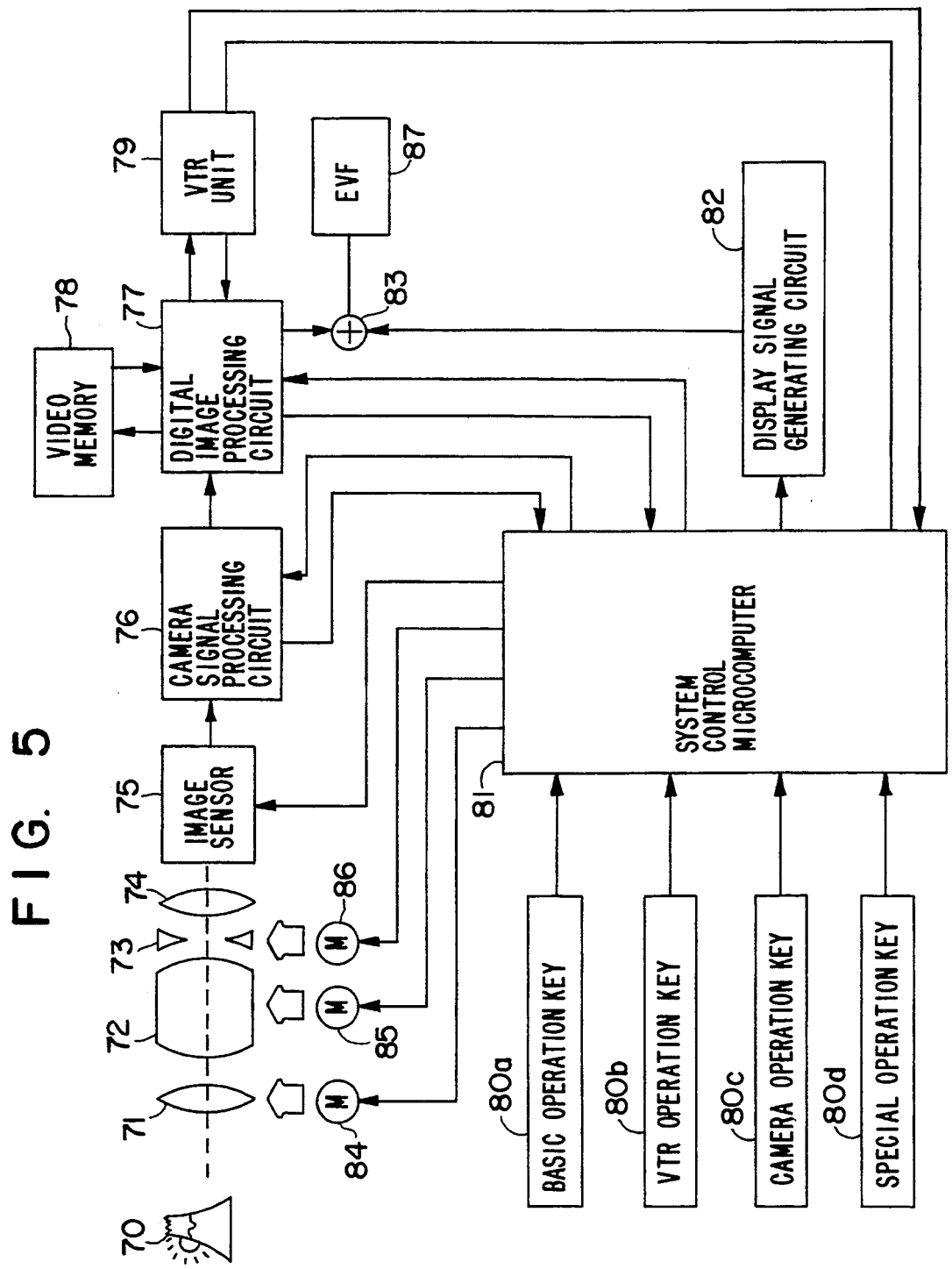

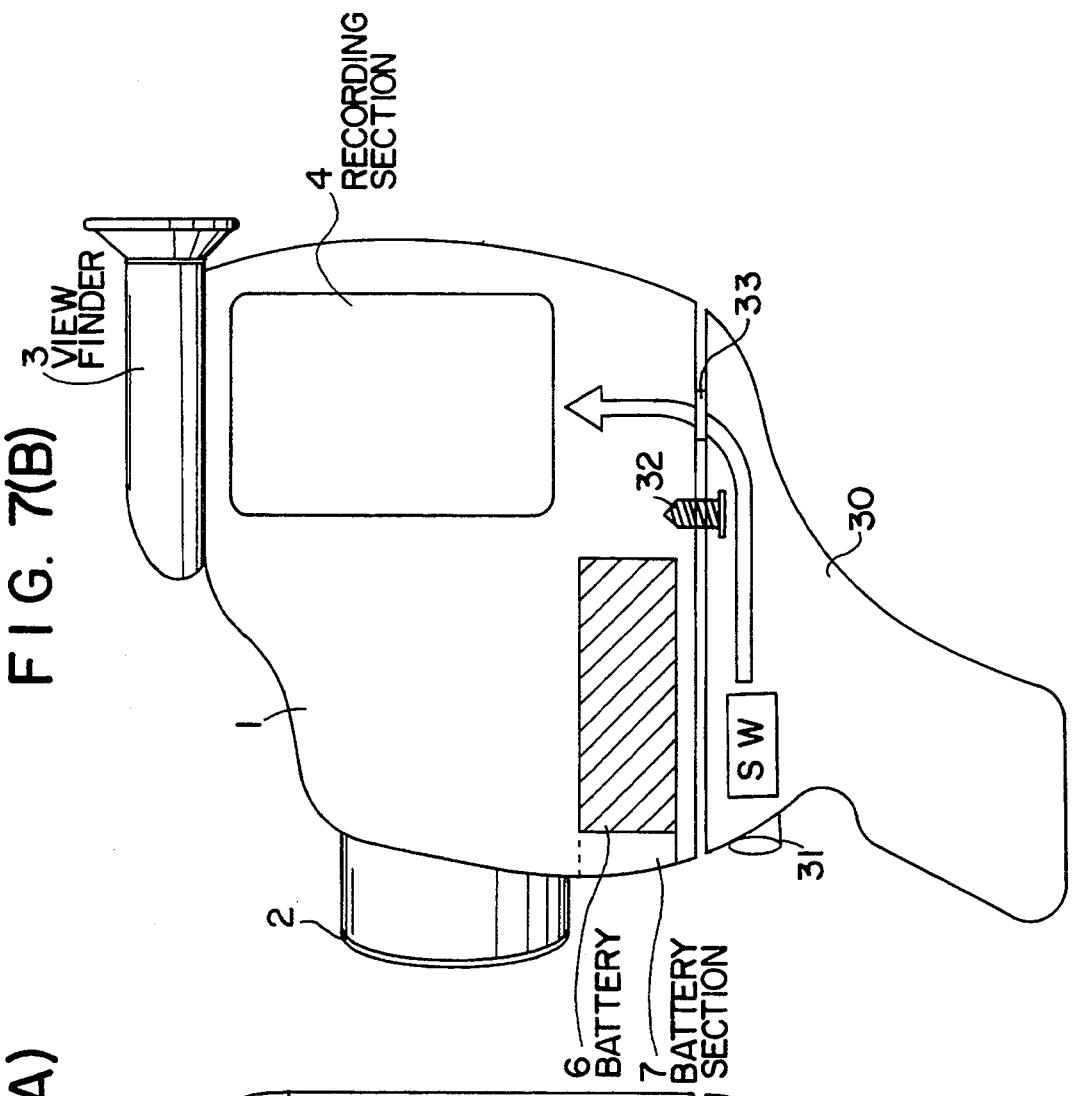

PORTABLE CAMERA HAVING A BATTERY COMPARTMENT BELOW THE LENS OPTICAL AXIS

This application is a continuation of application Ser. No. 07/726,282 filed Jul. 5, 1991, abandoned.

BACKGROUND OF THE INVENTION

1. Field of the Invention

The present invention relates to a camera, and more particularly, to a camera in which a battery can be loaded/unloaded from the main body thereof.

2. Description of the Related Art

As a portable camera in which a battery is loaded/unloaded, a camera-VTR (Video Tape Recorder) in which a VTR and a camera are contained in one piece (the so-called "camcorder") is known. This type of camera-VTR has become remarkably advanced in recent years. As a result, it has a great number of functions, though it is a portable apparatus.

As the camera-VTR has come to be so multi-functional, the amount of power consumed while performing these functions has increased greatly. Thus, the battery which is used as the power source has also become larger.

FIGS. 1(A) and 1(B) are views showing the exterior of a conventional camera-VTR, where FIG. 1(A) is a front view thereof, and FIG. 1(B) is a side view thereof. In FIGS. 1(A) and 1(B), reference numeral 1 denotes a camera housing; reference numeral 2 denotes a lens in which an optical system is placed; reference numeral 3 denotes an electronic view finder (EVF); reference numeral 4 denotes a VTR; reference numeral 5 denotes a grip in which a battery load section 7 having a battery 6 loaded therein is disposed; reference numeral 8 denotes a key arrangement section in which various kinds of operation keys are laid out; reference letter A denotes a length in the vertical direction of the key arrangement section 8; and reference letter B denotes a thickness of the battery 6.

In FIG. 1(A), reference letter G denotes a center of gravity point of this camera-VTR. Accordingly, if the grip 7 is held, a moment acts in the direction of the arrow M in the figure. This causes so-called camera shake. What is more, even if the camera is held from both sides thereof, the center of gravity G deviates from an optical axis 9 of the lens, and therefore the optical axis 9 itself is likely to shake.

A large number of various types of camera-VTRs in the rear side of which a battery is loaded have been commercially produced. However, even in such types of camera-VTR, a moment acts in the vertical direction with respect to the lens having an optical system, causing a camera shake similar to that described above.

In multi-functional camera-VTRs, batteries have become larger in recent years, and this tendency will become even stronger in the future.

A camera-VTR having multi functions as described above has a problem in that there is not enough space for laying out a great number of keys because various operation members, such as a large number of switches, are required.

SUMMARY OF THE INVENTION

The present invention has been devised in light of the above-mentioned circumstances. It is accordingly an object of the present invention to provide a camera constructed so as to be capable of taking greatly improved photographs.

Another object of the present invention is to provide a camera, in which a battery is loaded/unloaded, which is constructed so as to have improved manuevability.

To this end, according to one aspect of the present invention, there is provided a camera comprising: an optical lens for accepting object light; a housing for housing the optical lens; and a battery load section in which a battery for supplying power to at least a part of the housing is loaded, the battery load section being disposed on the bottom of the housing.

These and other objects, features and advantages of the present invention will become clear when reference is made to the following description of the preferred embodiments of the present invention, together with reference to the accompanying drawings.

BRIEF DESCRIPTION OF THE DRAWINGS

FIG. 1(A) is a front view thereof; and FIG. 1(B) is a side view thereof;

FIG. 2(A) is a front view thereof; and FIG. 2(B) is a side view thereof;

FIG. 3(A) is a top plan view thereof; and FIG. 3(B) is a side perspective view thereof;

FIGS. 4(A), 4(B), and 4(C) are views showing a battery which can be loaded into the camera-VTR shown in FIGS. 3(A) and 3(B);

FIG. 5 is a view showing a schematic circuit diagram of the camera-VTR shown in FIGS. 3(A) and 3(B);

FIGS. 7(A) and 7(B) are views showing the construction of a camera-VTR of another embodiment of the present invention: FIG. 7(A) is a front view thereof; and FIG. 7(B) is a side view thereof.

DETAILED DESCRIPTION OF THE PREFERRED EMBODIMENTS

The embodiments of the present invention will be explained below with reference to the accompanying drawings.

Figure 1A:
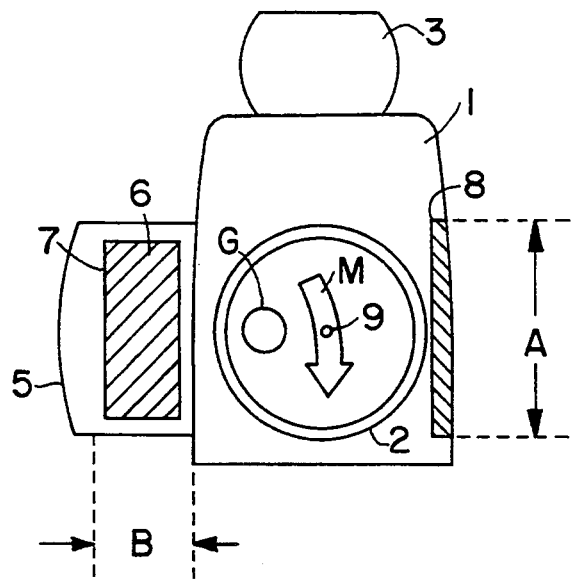
FIGS. 1(A) and 1(B) are views showing the exterior of a conventional camera-VTR.
Figure 1B:
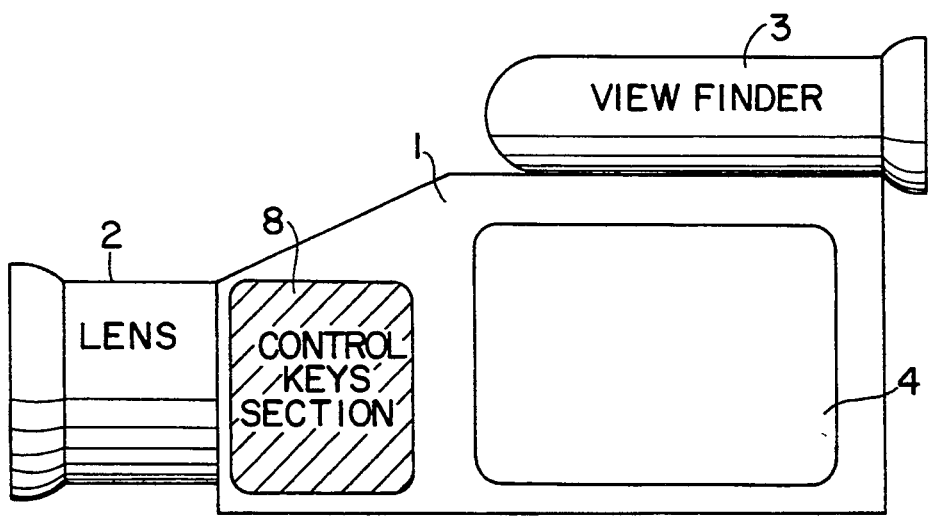
Figure 2A:
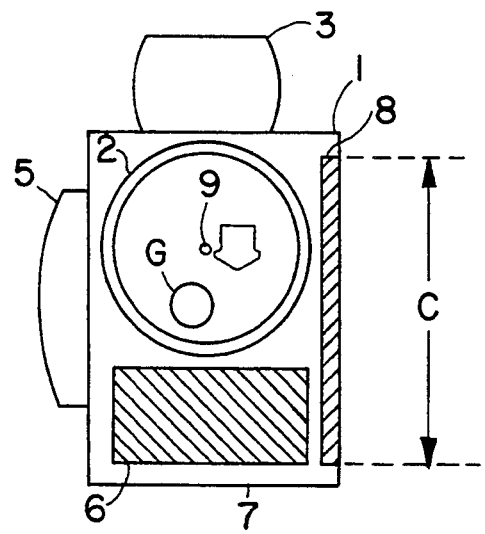
FIGS. 2(A) and 2(B) are views showing the conceptual construction of a camera-VTR to which the present invention is applied.
Figure 2B:
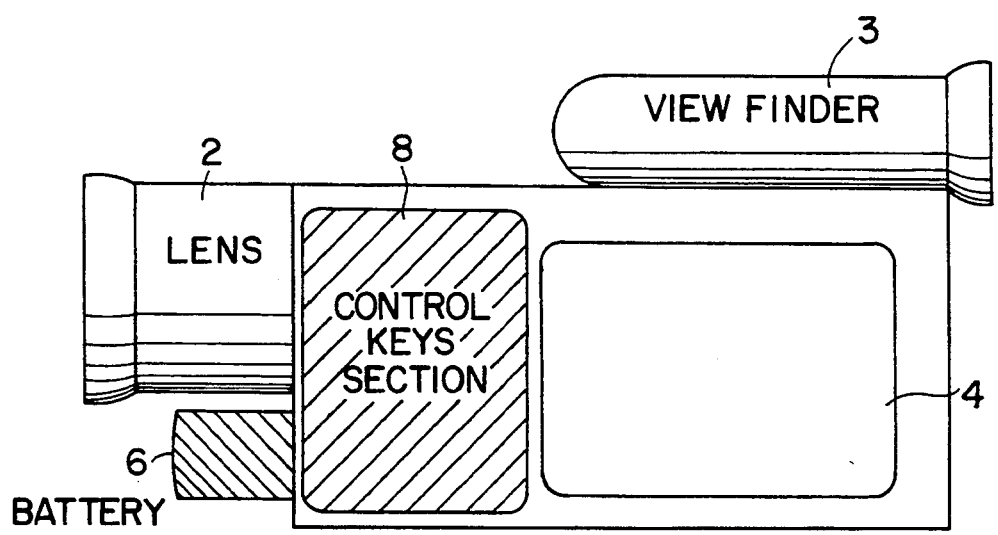

FIGS. 2(A) and 2(B) are views showing the conceptual construction of a camera-VTR to which the present invention is applied: FIG. 2(A) is a front view thereof; and FIG. 2(B) is a side view thereof. In FIGS. 2(A) and 2(B) and FIGS. 1(A) and 1(B), the same reference numerals are used to indicate like parts which perform the same functions.

In the present embodiment, as shown in FIGS. 2(A) and 2(B), a battery load section 7 is disposed on the bottom of a camera housing 1. A battery 6 is disposed directly below the lens section 2. As a result, the center of gravity G is positioned near an optical axis 9 and acts downward. Therefore, in the present embodiment, the weight balance is excellent in a case where a camera housing is held from both sides thereof. Camera shake or the like can be suppressed because a large moment will not be generated, particularly with respect to the lens optical axis 9. A grip 5 is also positioned closer to the center of gravity G than the example of FIG. 8, thus camera shake in a one-hand holding operation can also be reduced.

The area of a key arrangement section 8 can be made sufficiently larger, as shown in FIG. 2(B). This results from the fact that a part corresponding to the thickness of the conventional battery 6 is placed on the bottom of the housing 1, which is indicated by letter "B" in FIG. 1(A), the dead space being moved into the side of the housing.

Figure 3A:
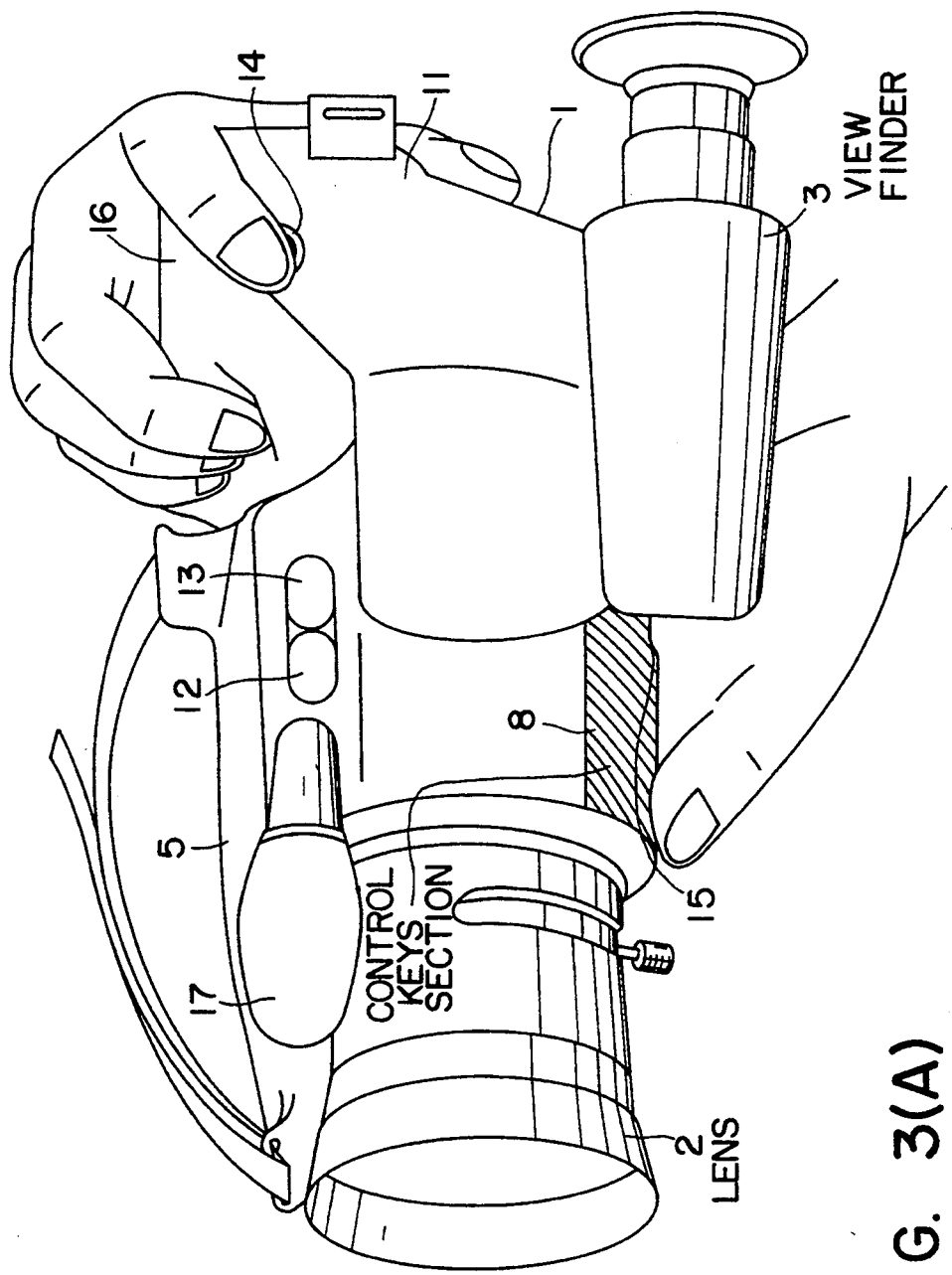
FIGS. 3(A) and 3(B) are views showing the detailed construction of a camera-VTR of an embodiment of the present invention.
Figure 3B:
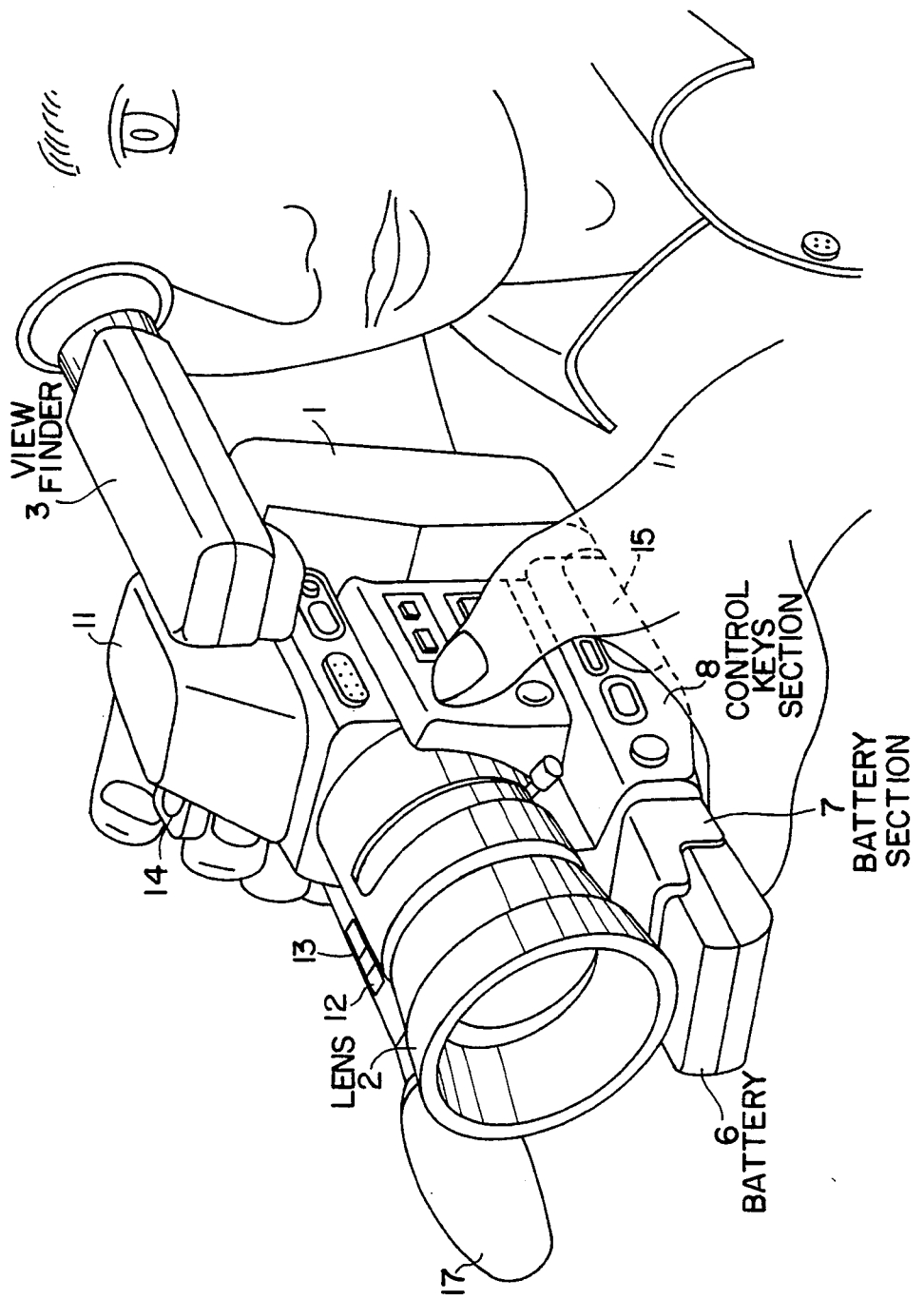

FIGS. 3(A) and 3(B) are views showing the detailed construction of a camera-VTR of an embodiment of the present invention: FIG. 3(A) is a top perspective view thereof; and FIG. 3(B) is a side perspective view thereof. In FIGS. 3(A) and 3(B) and FIGS. 2(A) and 2(B), the same reference numerals are used to indicate like parts which perform the same functions. Reference numeral 11 denotes a top side of the camera housing 1; reference numerals 12 and 13 each denote a power zoom switch; reference numeral 14 denotes a phototaking trigger switch; reference numeral 15 denotes a notch provided in the key arrangement section 8 of the camera housing 1; and reference numeral 16 denotes a side grip (a second grip). The notch 15 functions so that the positioning of the left hand is performed and a finger (the thumb) of the positioned left hand can reach a section higher than the key arrangement section 8 in a state in which the bottom side of the camera housing 1 is held by the left hand while the side grip 16 is held by the right hand.

FIGS. 4(A), 4(B), and 4(C) are views showing a battery which can be loaded into the camera-VTR shown in FIGS. 3(A) and 3(B). FIGS. 4(A), 4(B), and 4(C) show respectively a standard battery 6a, a thick-type battery 6b, and a lengthy-type battery 6c. The top, middle, and bottom of each view are respectively a side view, a top plan view, and a bottom plan view. As shown in these figures, a positive-polarity contact point 21, a negative-polarity contact point 22, a locking hole 23, and a positioning hole 24 are disposed at a common position in one end of the bottom surface of each battery 6a, 6b, and 6c. The shape on one end of this bottom surface is common to each battery.

When loading a plurality of kinds of batteries of different sizes in this above manner, if, for example, these batteries are loaded into a grip, the sensation of touch experienced when holding the grip will vary greatly depending upon the kind of batteries. In contrast, there is hardly any variation in the sensation of touch experienced when loading these different types of batteries into the bottom of the camera housing.

Next, the arrangement of operation switches of the camera-VTR shown in FIGS. 3(A) and 3(B) will be explained with reference to FIG. 5 and FIGS. 6(A), 6(B), and 6(C).

FIG. 5 is a block diagram showing the schematic circuit arrangement of the camera-VTR of this embodiment.

Light from an object 70 is formed into an image on an image sensor 75 by means of a photographing optical system comprising a lens 71 for adjusting a focal point, a lens 72 for adjusting an angle of field (zoom ratio), a diaphragm 73 for adjusting photoexposure, and various types of compensating lenses 74. The image is converted into an electrical signal by image sensor 75. The electrical signal is converted into a video signal which complies with a television signal by means of a camera signal processing circuit 76. This video signal is supplied to a digital image processing circuit 77 where various processings are performed by using a video memory 78.

The video signal processed by the digital image processing circuit 77 is supplied to a VTR 79 where it is recorded or reproduced. The operations of the VTR 79 and the digital image processing circuit 77 are controlled by a system controlling microcomputer 81 in accordance with the operation of operation keys 80a, 80b, 80c, and 80d. The information indicating this control status is supplied to a display signal generation circuit 82 where that information is converted into a video signal, such as a letter or the like corresponding to this information. A video signal from the display signal generation circuit 82 and a video signal from the digital image processing circuit 77 are combined by an adder 83, and the combined video signal is displayed on an electronic view finger (EVF) 87.

Figure 6A:
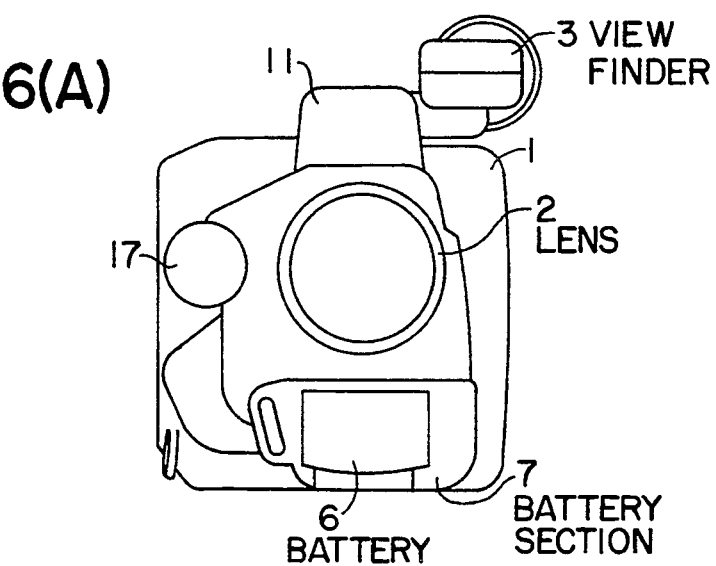
FIGS. 6(A), 6(B), and 6(C) are a front view, a side front view, and a bottom plan view of the camera-VTR shown in FIGS. 3(A) and 3(B)
Figure 6B:
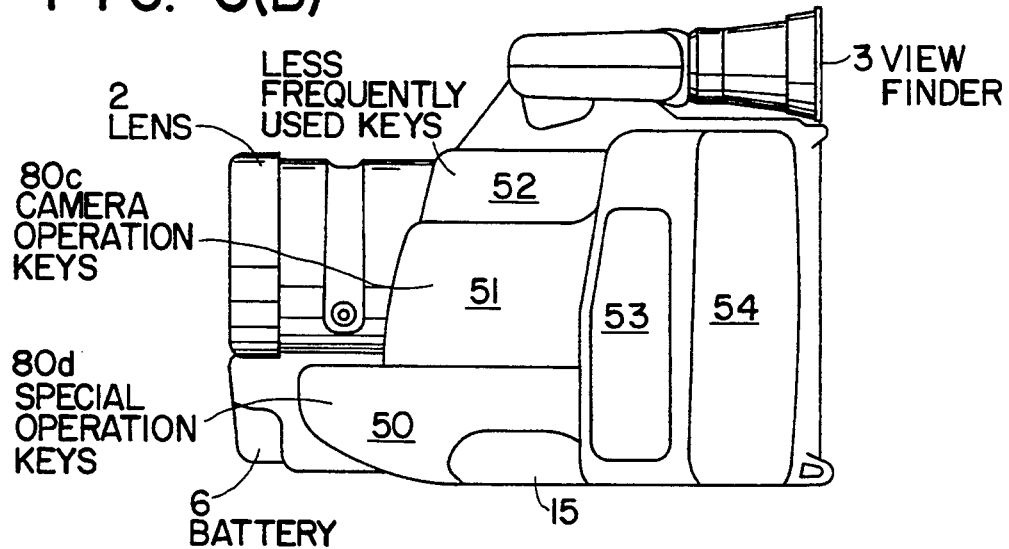
Figure 6C:
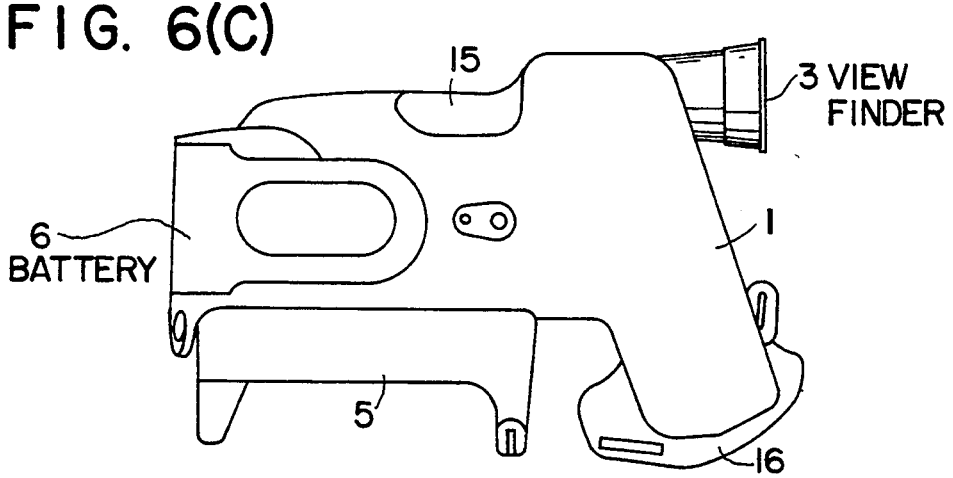

Operation keys 80a, 80b, 80c, and 80d will now be explained with reference to FIGS. 6(A), 6(B), and 6(C). FIGS. 6(A), 6(B), and 6(C) are respectively a front view, a side front view, and a bottom plan view of the camera-VTR shown in FIGS. 3(A) and 3(B). The basic operation key 80a includes a power-supply switch for turning a power supply on or off, a key for ejecting a cassette, a phototaking recording trigger switch 14 (shown in FIG. 3), power zoom switches 12 and 13 (shown in FIG. 3), and a camera mode switching switch or the like. Keys (the power-supply switch, the ejection key, the mode switching switch) which are less frequently used or the like are positioned in the position indicated by numeral 52 in FIG. 6(B). Reference numeral 80b denotes VTR operation keys. These keys include a reproduction key, a recording key, a tape fast-forward/rewinding key, a stop key, a pause key, and the like. They are placed on the top surface 11 of the camera. Reference numeral 80c denotes camera operation keys. These operation keys include a white balance adjustment key and its automatic/manual switching key, an exposure adjustment automatic/manual switching key, a focal-point automatic/manual switching key, an electronic shutter, and the like. These keys are placed in the position indicated by numeral 51 in FIG. 6(B). Reference numeral 80d denotes special operation keys. These operation keys include a known fade key, a title key, and the like. In the present embodiment, they include operation keys for special functions in which the digital image processing circuit 77 is used, for example, cross fade in which a screen is gradually changed, freeze in which a still image is photographed and recorded, electronic zoom in which a part of an image is enlarged, and the like. These special operations keys 80d are placed at a position 50 shown in FIG. 6(B).

In such a camera-VTR as shown in FIGS. 3 to 6, the center of gravity position lies in the vicinity of the optical axis of the optical system. Therefore, a deviation from the optical axis is small, and camera shake in a photographed image can be suppressed. When the camera is held by both hands, one of which holds the side grip 16, camera shake can be reduced to a very small amount. Also, when one of the hands instead holds the grip 5, no large moment will occur because the center of gravity is close to the part of the camera being held. The camera can be held very easily no matter which one of a plurality of types of batteries is used.

FIG. 7(A) and 7(B) are views showing the construction of a camera-VTR of still another embodiment of the present invention: FIG. 7(A) is a front view thereof;

and FIG. 7(B) is a side view thereof. In FIGS. 7(A) and 7(B), and FIGS. 2 to 6, the same reference numerals are used to indicate like parts which perform the same functions. In FIG. 7, reference numeral 30 denotes a pistol grip which is releasably mounted on the bottom of the camera housing 1 by a screw 32. Reference numeral 31 denotes a photographing trigger switch. Information about the switch 31 being on or off is transmitted to the main body of the camera, including the VTR 4, via a connector 33.

As can be seen from FIGS. 7(A) and 7(B), the center of gravity can be placed directly below the lens optical axis by placing the battery load section 7 on the bottom of the camera housing 1. Therefore, an adverse influence on a photographed image due to camera shake or the like can be reduced. Since the grip 30 is positioned directly below the center of gravity, very stable photographing can be performed by holding the grip 30.

Figure 8:
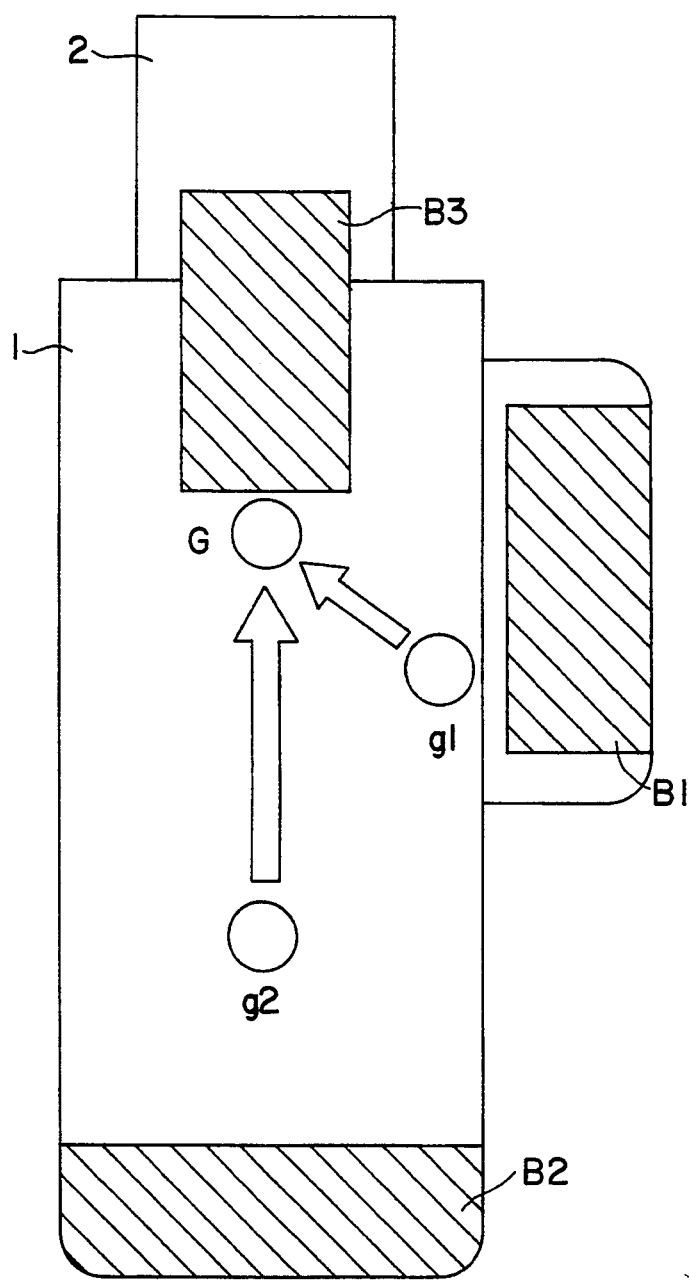
FIG. 8 is a view showing the functional effect of the embodiments of the present invention.

FIG. 8 is a view showing the functional effect of the embodiment of the present invention, in which the camera-VTR is schematically shown. As shown in FIG. 8, when either a battery B1 loaded into a conventional grip section or a battery B2 loaded in the tail end of the camera housing 1 is moved to and loaded into the bottom of the camera housing 1, as shown by B3, the position of the center of gravity moves from points shown by g1 and g2 to G. This position of the center of gravity G is located in the vicinity of the optical axis of the lens section and further in the vicinity of a photographing element. As a consequence, movements of the optical axis and the photographing element can be made smaller.

As has been explained above, according to the present invention, in a camera in which a battery is loaded, a center of gravity is positioned closer to the lens than a case in which a battery is loaded in the rear side or a grip. Therefore, when the camera is held from both sides thereof, the movement to the optical axis itself will hardly occur. What is more, the grip can be disposed at a position near the center of gravity, and camera shake during one-hand operations is reduced with respect to the prior art. In addition, a space for laying out operation switches an be increased by using the bottom surface of the camera in which operations switches cannot be positioned.

The individual components shown in outline or designated by blocks in the Drawings are all well-known in the camcorder arts, and their specification construction and operation are not critical to the operation or best mode for carrying out the invention.

Many different embodiments of the present invention may be constructed without departing from the spirit and scope of the present invention. It should be understood that the present invention is not limited to the specific embodiments described in this specification, and is only limited by the appended claims.

What is claimed is:

1. A video camera comprising:
   optical lenses for receiving light from an object;
   a conversion element for converting the light from the object to an electrical signal;
   a processing circuit for processing the electrical signal to produce a video signal;
   a housing for housing each of (i) said conversion element, (ii) said processing circuit, and (iii) at least a portion of said optical lenses; and
   a battery load section for supporting a battery which supplies power to said video camera, said battery load section being disposed at a bottom of said housing and capable of supporting different kinds of batteries of different sizes.

2. A video camera according to claim 1, wherein another portion of said optical lenses protrudes from said housing from a side facing the object, and said battery load section supports the battery so that a portion of the battery protrudes from said housing from the side facing the object.

3. A video camera according to claim 1, wherein said housing comprises two portions, a first portion underneath and extending parallel with an optical axis of said optical lenses, and a second portion, adjacent to the first portion and intersecting the optical axis, said battery load section being disposed in the first portion.

4. A video camera according to claim 3, further comprising a recording unit for recording the video signal produced from said processing circuit, said recording unit being disposed in said second portion.

5. A video camera according to claim 3, further comprising grip for holding said housing, said grid being disposed on a side surface of said video camera in the second portion.

6. A video camera according to claim 3, further comprising a grip for holding said housing, said grip being disposed on a side surface of said video camera in the first portion.

7. A video camera according to claim 1, further comprising a manually operable member for controlling an operation of said camera, wherein a lower part of a side surface of said housing is coextensive with a side of the battery supported by said battery load section, and said manually operable member is disposed on the lower part of the side surface of said housing.

8. A video camera according to claim 7, wherein said manually operable member controls an operation of said processing circuit.

9. A camera comprising:
   optical lenses for receiving light from an object;
   a recording part associated with said optical lenses for recording image information corresponding to the light from the object received by said optical lenses;
   a housing for housing said recording part and at least a portion of said optical lenses;
   a manually operable member for controlling an operation of said camera; and
   a battery load section for supporting a battery for supplying power to said camera, said battery load section being disposed at a bottom of said housing and capable of supporting different kinds of batteries of different sizes.

10. A camera according to claim 9, wherein said recording part includes a conversion element for converting the light from the object to an electrical signal and a processing circuit for processing the electrical signal to produce a video signal, and said manually operable member controls an operation of said processing circuit.

11. A camera according to claim 9, further comprising a grip for holding said housing, wherein said grip is positioned on a side surface of said camera.

12. A camera according to claim 9, wherein said housing comprises two portions, a first portion underneath and extending parallel with an optical axis of said optical lenses, and a second portion, adjacent to said first portion and intersecting the optical axis, said battery load section being disposed in the first portion.

13. A camera according to claim 12, further comprising a processing circuit for processing the light from the object to produce a video signal, wherein said recording part further includes a recording unit for recording the video signal produced from said processing circuit, said recording unit being disposed in said second portion.

14. A camera comprising:
   optical lenses for receiving light from an object;
   a recording part associated with said optical lenses for recording image information corresponding to the light from the object received by said optical lenses;
   a housing for housing said recording part and at least a portion of said optical lenses; and
   a battery load section for supporting a battery for supplying power to said camera, said battery load section being disposed at a bottom of said housing, said battery load section including an opening which can support a plurality of kinds of batteries of different sizes.

15. A camera according to claim 14, wherein said opening is disposed on a surface of a side of said housing facing the object, and said opening an support a plurality of kinds of batteries of different dimensions in a direction parallel to an axis of said optical lenses.

16. A camera according to claim 14, wherein said opening is disposed on a bottom surface of said housing, and said opening can support a plurality of kinds of batteries of different dimensions in a vertical direction.

17. A camera according to claim 14, wherein said battery load section is capable of supporting at least a portion of said batteries directly below said optical lenses.

18. A camera according to claim 14, wherein said housing comprises two portions, a first portion underneath and extending parallel with an optical axis of said optical lenses, and a second portion, adjacent to the first portion and intersecting the optical axis, said battery load section being disposed in the first portion.

19. A camera according to claim 18, wherein said recording part is disposed in the second portion.

20. A camera according to claim 18, further comprising a grip for holding said housing, said grip being positioned on a side surface of said camera in the second portion.

21. A camera according to claim 18, further comprising a grip for holding said housing, said grip being positioned on a side surface of said camera in the first portion.

22. A video camera comprising:
   optical lenses for receiving light from an object;
   a conversion element for converting the light from the object to an electrical signal;
   a processing circuit for processing the electrical signal to produce a video signal;
   a recording unit for recording the video signal produced by said processing circuit;
   a housing for housing (i) said conversion element, (ii) said processing circuit, (iii) said recording unit, and (iv) at least a portion of said optical lenses, said housing comprising a first portion underneath and extending parallel with an optical axis of said optical lenses, and a second portion, substantially perpendicular to the optical axis, said recording unit being disposed in the second portion so that a thickness of said recording unit is arranged substantially along the optical axis; and
   a battery load section for supporting a battery for supplying power to said video camera, said battery load section being disposed at a bottom of said first portion section and capable of supporting different kinds of batteries of different sizes.

23. A video camera according to claim 22, further comprising a grip for holding said housing, said grip being disposed on a side surface of said video camera in the second portion.

24. A video camera according to claim 22, further comprising a grip for holding said housing, said grip being disposed on a side surface of said video camera in the first portion.

25. A video camera comprising:
   optical lenses for receiving light from an object;
   a conversion element for converting the light from the object to an electrical signal;
   a processing circuit for processing the electrical signal to produce a video signal;
   a housing for housing at least said conversion element and said processing circuit; and
   a battery load section for supporting a battery for supplying power to said housing, said battery load section being disposed at a bottom of said housing and capable of supporting different kinds of batteries of different sizes.

* * * * *

UNITED STATES PATENT AND TRADEMARK OFFICE
CERTIFICATE OF CORRECTION

PATENT NO. : 5,347,307
DATED : September 13, 1994
INVENTOR(S) : Tanaka et al.

It is certified that error appears in the above-indentified patent and that said Letters Patent is hereby corrected as shown below:

On title page, item [56], col. 2, line 3,

"1099379 4/1989 Japan" should read --1-99379 4/1989 Japan--

Column 5

Line 43, "an" should read --can--.
Line 44, "operations" should read --operation--.

Column 6

Line 21, "grip" should read --a grip--.

Signed and Sealed this

Twenty-first Day of February, 1995

Attest:

BRUCE LEHMAN

Attesting Officer     Commissioner of Patents and Trademarks